United States Patent [19]

Hall et al.

[11] Patent Number: 5,553,328
[45] Date of Patent: Sep. 10, 1996

[54] AUTOMATICALLY DEPLOYABLE AND RETRACTABLE COMBINER MECHANISM

[75] Inventors: Gordon C. Hall, Fremont; Steven D. Smith, San Jose; Jerome T. Carollo, Carlsbad, all of Calif.

[73] Assignee: Kaiser Aerospace and Electronics, Foster City, Calif.

[21] Appl. No.: 221,059

[22] Filed: Mar. 17, 1994

[51] Int. Cl.⁶ .............................. A42B 3/04; C02B 27/10
[52] U.S. Cl. .................... 2/422; 2/6.2; 359/632
[58] Field of Search ................... 2/410, 6.1, 6.2, 2/6.6, 6.3, 422, 10; 359/629, 630, 632, 482, 409

[56] References Cited

U.S. PATENT DOCUMENTS

| 3,170,979 | 2/1965 | Baldwin | 88/1 |
|---|---|---|---|
| 4,081,209 | 3/1978 | Heller et al. | 350/174 |
| 4,364,636 | 12/1982 | Ellis | 350/174 |
| 4,829,843 | 5/1989 | Suzuki | 74/470 |
| 4,976,327 | 12/1990 | Abujudom | 180/68.2 |
| 4,984,542 | 1/1991 | Rische | 123/179 |
| 4,992,339 | 2/1991 | Geogopoulos | 429/7 |
| 5,019,932 | 5/1991 | Iwata | 360/105 |

FOREIGN PATENT DOCUMENTS

| 2672778 | 8/1992 | France | 2/6.2 |
|---|---|---|---|
| 2672777 | 8/1992 | France | 2/6.1 |
| 9414349 | 7/1994 | WIPO | 2/422 |

*Primary Examiner*—C. D. Crowder
*Assistant Examiner*—Michael A. Neas
*Attorney, Agent, or Firm*—Marvin H. Kleinberg; Marshall A. Lerner; Michael J. Ram

[57] ABSTRACT

Device for rapidly and automatically deploying and retracting a combiner attached to a visored helmet. A combination of opposing springs, one made from conventional materials and the other from shape memory alloy (SMA), effects a detent mechanism and the retracting and deploying mechanism. The conventional spring normally exerts a greater force than the SMA spring, but the latter exerts the greater force upon being heated, preferably by means of an electric current passing through the spring. Alternative deployment and retraction means include a solenoid-conventional spring combination or an electrical motor which used in conjunction with a locking and unlocking means incorporating a SMA spring.

14 Claims, 5 Drawing Sheets

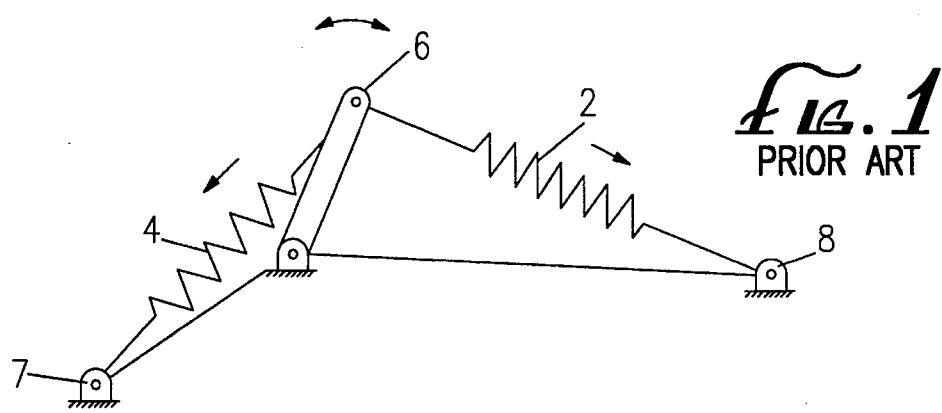
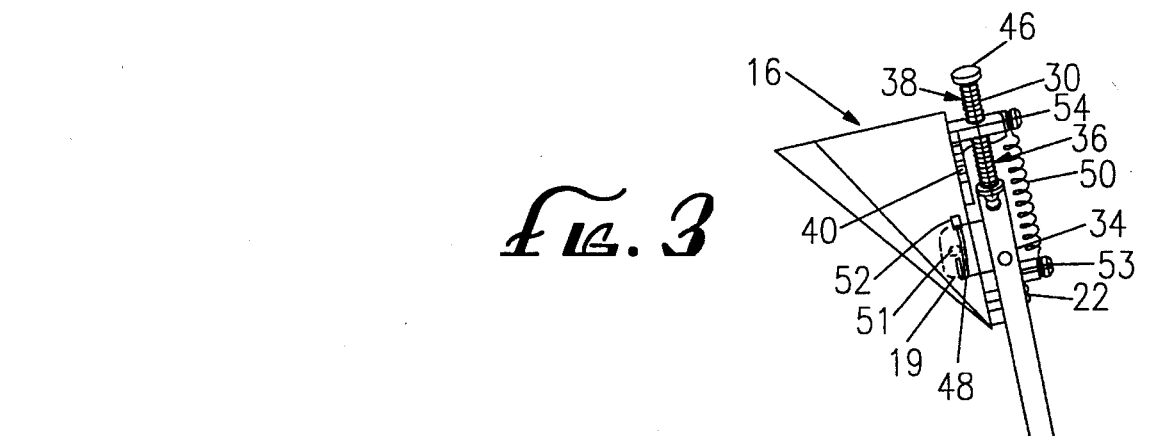
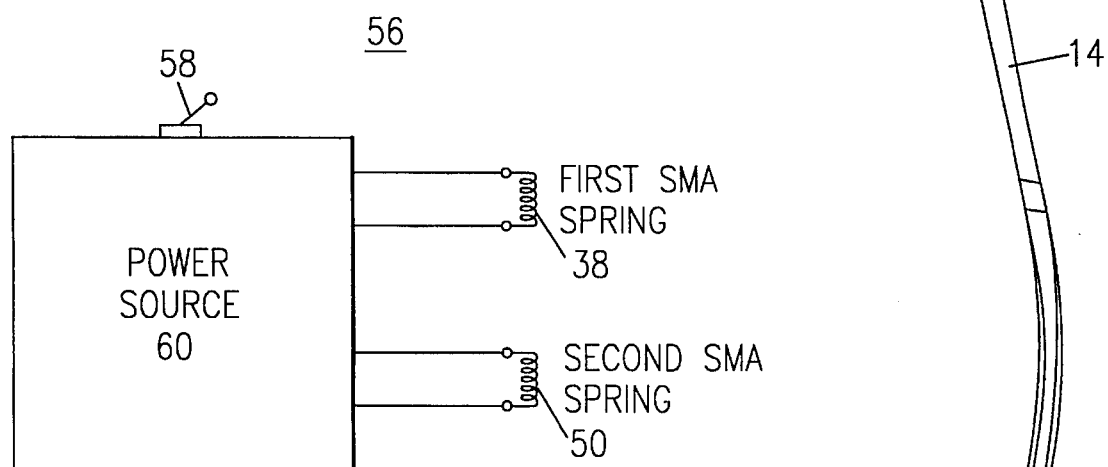

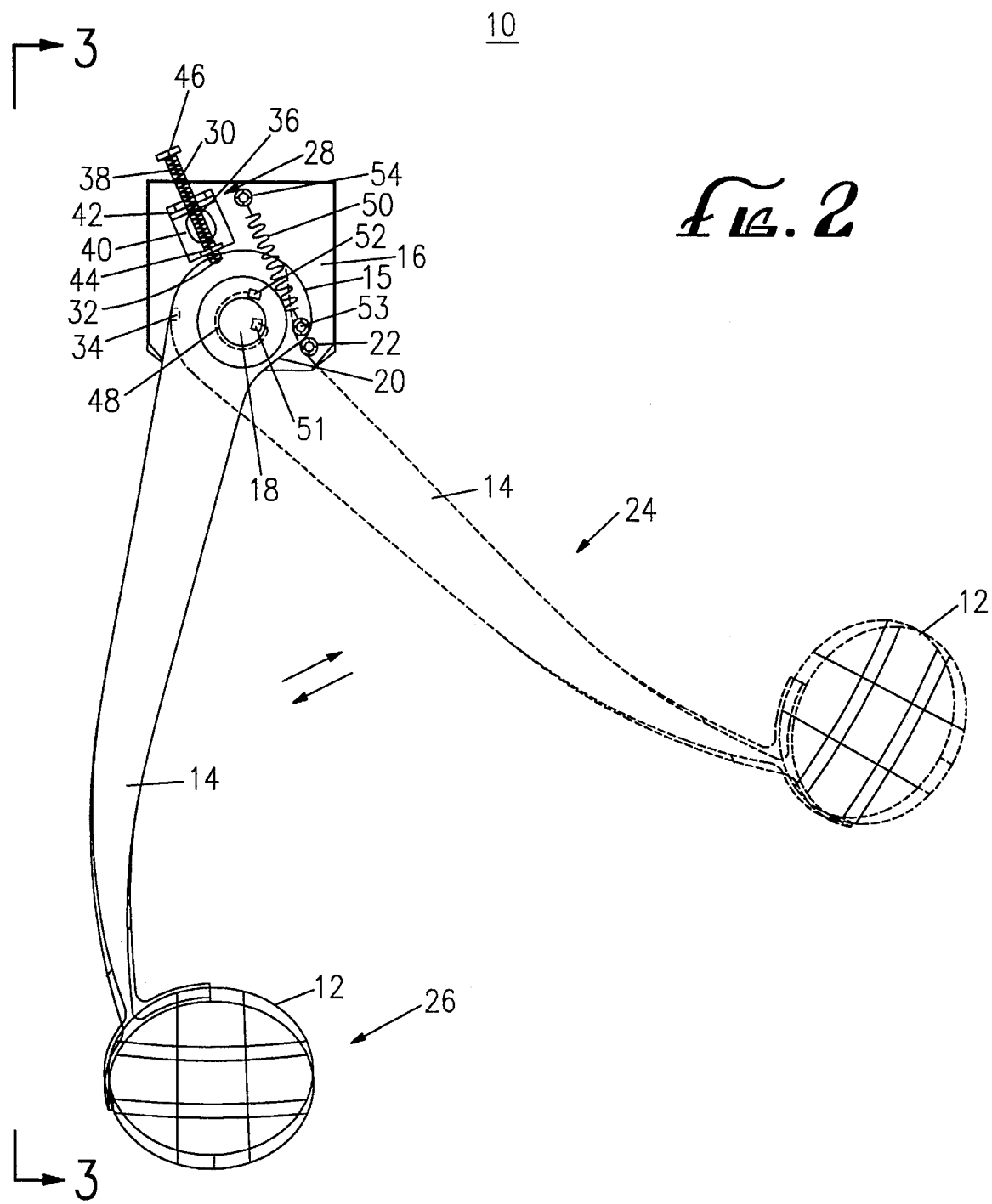

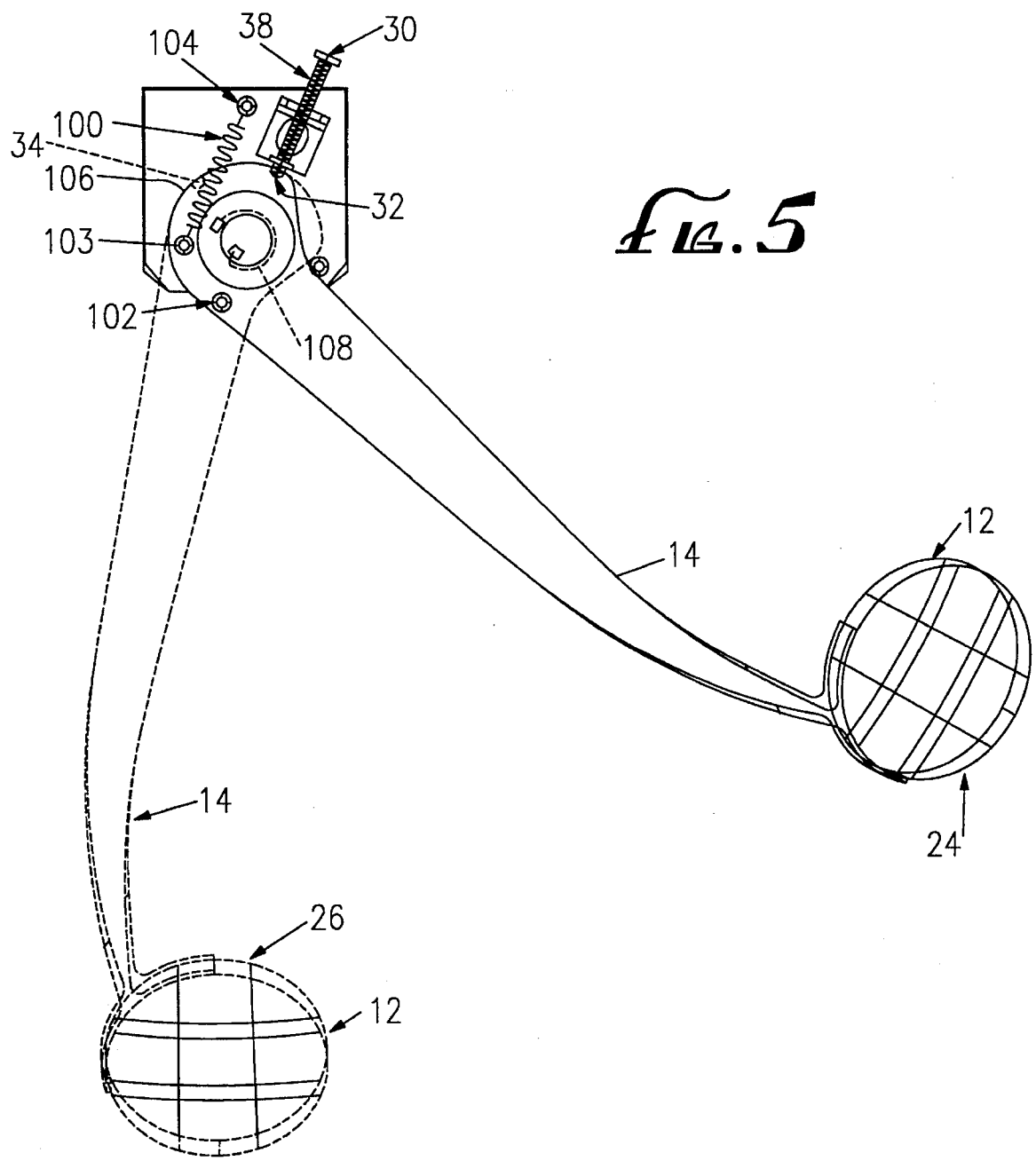

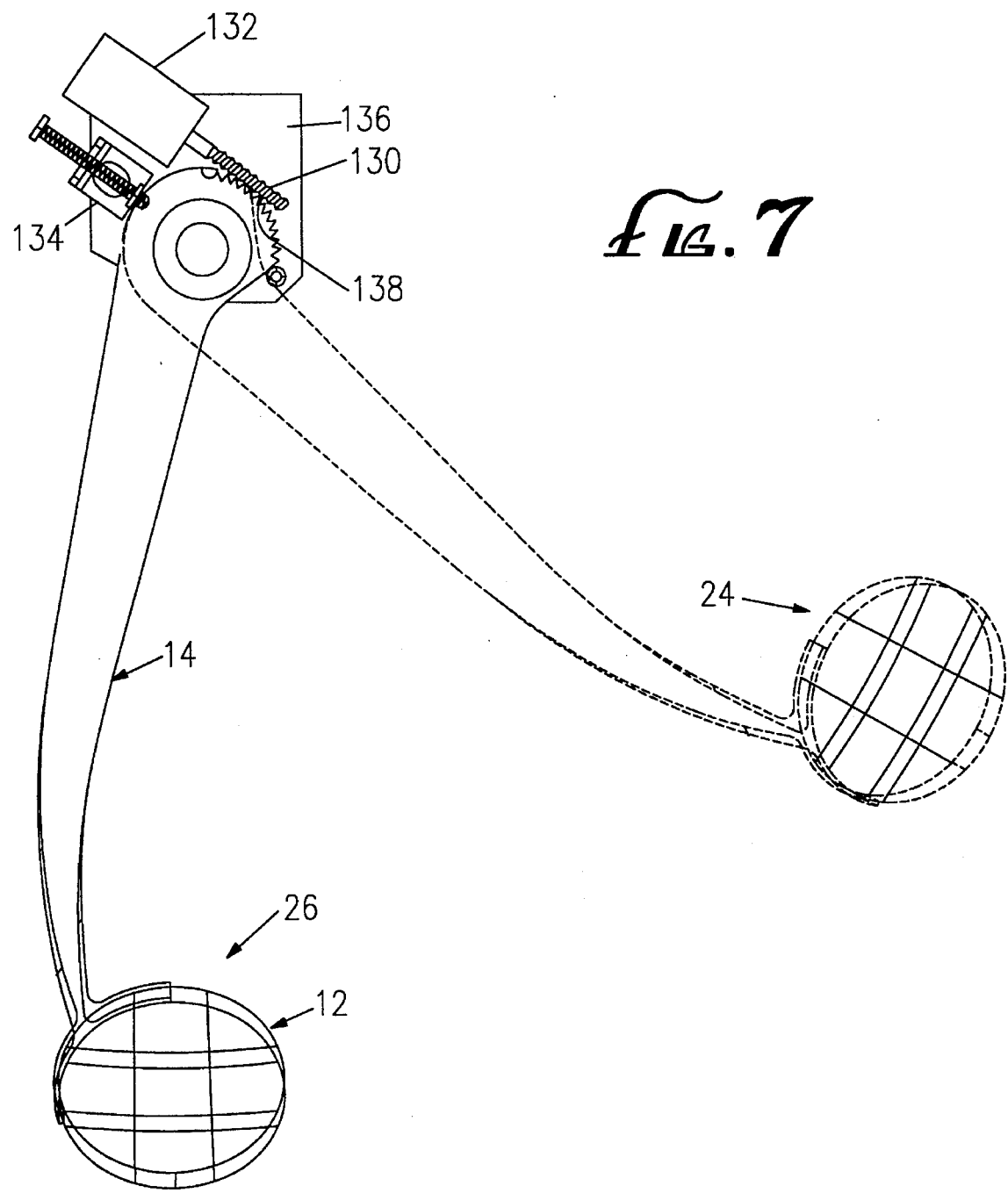

AUTOMATICALLY DEPLOYABLE AND RETRACTABLE COMBINER MECHANISM

BACKGROUND OF THE INVENTION

The present invention relates to information display systems and, more particularly, an improved mechanism for extending and retracting an image combiner that is attached to the helmet worn by an aircraft pilot.

1. Review of the Prior Art

Sometimes it is necessary for aircraft pilots to simultaneously view both the exterior scene within the normal field of vision and information provided by an information display system. "Heads up" displays can be achieved through the use of a combiner mechanism, which can be a part of the aircraft or can be a part of the helmet worn by the user, as taught in Ellis, U.S. Pat. No. 4,364,636, and Baldwin, U.S. Pat. No. 3,170,979. However, as pointed out in Ellis, the device in Baldwin is not capable of being used with a visored helmet, which is essential for military aircraft pilots and observers.

When dealing with helmet mounted displays, it is desirable that the combiner, if not in place at all times, be deployed quickly, or automatically, by means of a remote control. Neither Ellis nor Baldwin teaches a device with this capability. Thus, neither is well-suited to ensure quick, reliable deployment and retraction of the combiner in a variety of situations, especially in times of emergency.

2. Summary of the Invention

The purpose of the present invention is to provide a helmet mounted combiner mechanism which can be automatically and rapidly deployed and retracted by various means, preferably without the use of hands. A preferred embodiment of the present invention uses a combination of conventional springs, together with springs made from shape memory alloy ("SMA"). A spring made from an SMA material such as a Nickel-Titanium ("NiTi") alloy can first be deformed and later be caused to "remember" its original shape by the application of heat. While heat can be applied from many common sources, such as a flame, steam or radiant heat, in the preferred embodiment an electrical current is passed through the spring and which heats the spring due to the electrical resistance of the spring wire. Once the SMA spring is heated, it is able to exert a greater force than a countervailing conventional spring, which normally exerts the greater force. By selectively applying heat using the SMA springs, a combiner can automatically be deployed or retracted without the need for the pilot to touch the mechanism.

Other deployment and retraction means taught herein include solenoids or similar devices, and electrical motors which are used in conjunction with a SMA type spring.

In summary, the present invention finds its main use in the cockpit of a modern military aircraft wherein a pilot's attention and hands are totally engaged in monitoring and controlling the plane. This device allows a pilot to automatically deploy a combiner into his viewing area. This can be accomplished without the pilot having to actually touch the combiner. Also, this may be accomplished without the need to move or modify the pilot's visor. In the event that the pilot does not need to use the combiner, he can remotely activate the invention's retraction feature. This is particularly advantageous in emergency situations when a pilot must act quickly to clear his field of view.

An apparatus constructed in accordance with the present invention includes, in combination, a bracket attached to a pilot's helmet, a combiner arm being rotatably mounted on the bracket, means to select either a deployed position or retracted position for the combiner, means to automatically deploy and lock the combiner into position to be viewed by the pilot and means to automatically retract and lock the combiner out of the view of the pilot.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

BRIEF DESCRIPTION OF THE DRAWINGS

FIG. 1 is diagram of a conventional spring combination used to rock a crank;

FIG. 2 is a frontal view of the preferred embodiment of the invention showing the combiner in the deployed and retracted positions;

FIG. 3 is a side view of the preferred embodiment of FIG. 2 taken along the line 3—3 in the direction of the appended arrows;

FIG. 4 is a block diagram of a circuit used to selectively apply current to SMA springs;

FIG. 5 is an alternative embodiment of the invention;

FIG. 7 is third embodiment of the invention using a screw drive to position the combiner.

DESCRIPTION OF THE PREFERRED EMBODIMENTS

Figure 6:
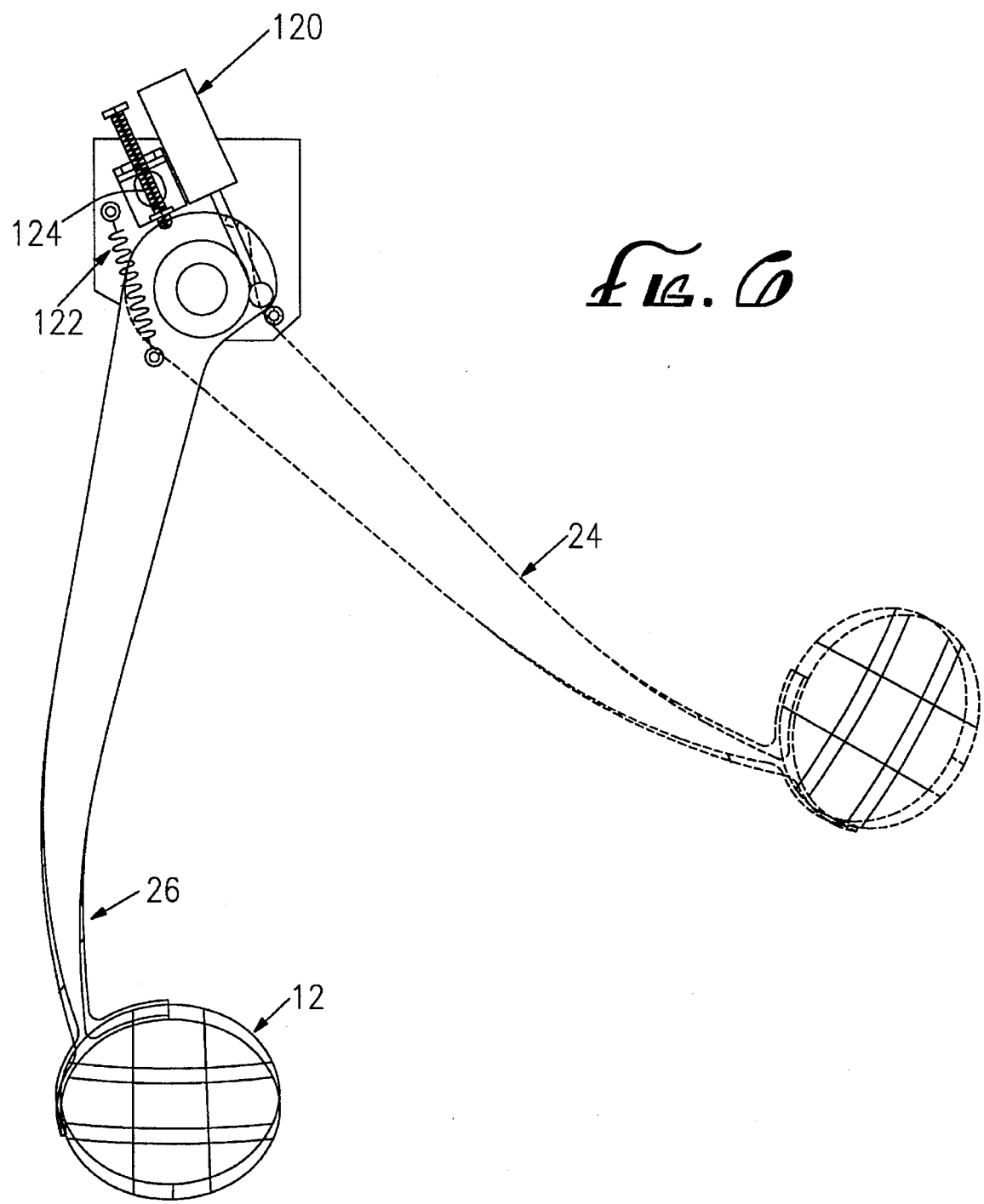
FIG. 6 is a second embodiment of the invention incorporating a solenoid to retract the combiner.

Turning first to FIG. 1, there is shown a simple prior art apparatus for "Rocking a Crank", as taught in Suzuki, U.S. Pat. No. 4,829,843. Suzuki employs an SMA spring 2 of variable tension, being opposed by a conventional spring 4 having constant tension. The crank 6 normally is pulled toward a first anchor 7 which is the direction of the force of conventional spring 4. This action by crank 6 will stretch SMA spring 2.

However, when an electric current is passed through the SMA spring 2 it will become heated, which will cause it to contract. The contraction force of the SMA spring 2 will exceed the tension of the conventional spring 4 and crank 6 will be "rocked" toward a second anchor 8. This is the direction of the force exerted by the SMA spring 2.

Upon cooling the SMA spring 2, the force of the SMA spring 2 is again overcome by the constant force of the conventional spring 4, and the crank 6 is "rocked" back in the direction of the first anchor 7 which is in the direction of force of the conventional spring 4.

As explained in Suzuki, a cool SMA spring initially "at rest" and having less force than a conventional spring, can be "activated" by being heated so that it exerts greater force than the conventional spring. In this way, an element within a mechanical device can be pushed or pulled in either of two or directions, depending on whether or not the SMA is activated or not. Of course, through the addition of more SMA or conventional springs pulling in various directions, the simple concept of Suzuki can be modified to fit an endless number of variations.

Other prior art inventions employing variations of the countervailing SMA/conventional spring arrangement include: Iwata, U.S. Pat. No. 5,019,932, for locking and unlocking of a read/write head carriage in a computer hard drive; Riche, U.S. Pat. No. 4,984,542, a thermal throttle actuator; Abujudom, II et al., U.S. Pat. No. 4,976,327, for regulation of air flow for a cooling car battery; and Georgopoulos, U.S. Pat. No. 4,992,339, for battery overheat protection.

In the preferred embodiment of the present invention, as shown in FIGS. 2 and 3, the automatic deployment and retraction mechanism 10 has a combiner 12 carried on a combiner arm 14, which is rotatably connected to the mechanism body 16 by means of a combiner arm pivot shaft 18 which fits into a pivot shaft recess 19 formed within the mechanism body 16. The pivot shaft 18 is rigidly connected to the upper end of the combiner arm 14, and rotates with respect to the mechanism body 16.

The upper end 15 of the combiner arm 14 is generally curved, but has a flat portion 20. The flat portion 20 allows the combiner arm 14 to swing through a restricted arc, being stopped at either extreme end of the arc by a peg 22 which is rigidly attached to mechanism body 16. While flat portion 20 of the upper end 15 of the combiner arm 14 can freely pass by the peg 22, the upper end 15 otherwise comes into abutting contact with the peg 22, thus restricting further rotation of the combiner arm 14 in that direction.

At the time that combiner arm 14 is stopped at either extreme end of its movement, it can be locked in either retracted position 24 or deployed position 26. This is accomplished by means of a mechanical detent pin mechanism 28. Detent pin assembly 28 which is primarily comprised of a bracket 40 fixedly mounted on plate 16 and a detent pin 30. At its upper edge bracket 40 is formed to have a flange 42 which has a hole through which detent pin 30 is slidely mounted.

A portion of detent pin 30, which extends below flange 42, is encircled with conventional coil spring 36. Conventional spring 36 extends between flange 42 and an annular rim 44 formed at the lower end of the detent pin 30. Detent pin 30 has a rounded lower end to allow it to fit into a first recess 32 or second recess 34 in the generally curved upper end 15 of the combiner arm 14. The rounded end of the detent pin 30 protrudes sufficiently far below the annular rim 44 to allow engagement of the detent pin 30 into either first recess 32 or second recess 34.

When the combiner is in a locked position, either deployed or retracted, the conventional spring 36 exerts downward pressure on rim 44 urging the rounded lower end of pin 30 into engagement with either first recess 32 or second recess 34. In order to unlock the combiner to change its position, detent pin 30 must be removed from either first recess 32 or second recess 34. This is accomplished by having an SMA spring overcome the countervailing pressure of conventional spring 36.

At the upper end of detent pin 30 a first SMA spring 38 is captured between the flange 42 and a head 46 formed at the top of the detent pin 30. When first SMA spring 38 is heated it exerts an upward pressure toward head 46, overcoming the countervailing pressure of conventional spring 36, urging detent pin 30 out of either the first recess 32 or second recess 34. In the retracted position 24, detent pin 30 is in the first recess 32. In deployed position 26 detent pin 30 is in second recess 34.

As seen in FIGS. 2 and 3, another set of countervailing springs, a conventional helical spring 48 and a second linear SMA spring 50, act in concert to effect the actual deployment and retraction of the combiner 12. The helical spring 48 fits around the combiner pivot shaft 18 inside the pivot shaft recess 19 within the mechanism body 16. One end of the helical spring 48 engages a first spring recess 51 within the combiner pivot shaft 18, while the other end engages a second spring recess 52 within the pivot shaft recess 19. When detent pin 30 is removed from first recess 32, helical spring 48 will urge the combiner arm 14 into deployed position 26.

The second SMA spring 50 is attached at one end to a first peg 53 at the upper end 15 of the combiner arm 14, near the upper portion of the flat portion end 20, and, at the other end, to a second peg 54 which is rigidly attached to the mechanism body 16.

The helical spring 48 normally exerts the greater force, and urges the combiner arm 14 outward from retracted position 24 to deployed position 26. The second SMA spring 50 tends to urge the combiner arm 14 to the retracted position 24, but can only overcome the countervailing force of the helical spring 48 when heated.

Assuming that combiner arm 14 is in retracted position 24, deployment of the combiner 12 is carried out by heating first SMA spring 38. For example, by passing an electric current through first SMA spring 38, it will cause the first SMA spring 38 to exert the greater force upward, withdrawing the detent pin 30 from the first recess 32, unlocking the combiner arm 14. As soon as the combiner arm 14 is free, helical spring 48 swings the combiner arm 14 into deployed position 26.

Once the combiner arm 14 begins to swing the combiner 12 into deployed position 26, but before the combiner 12 actually reaches deployed position 26, the current to the first SMA spring 38 is halted, allowing it to cool. Upon reaching deployed position 26, the conventional spring 36 exerts a greater force than the now cooling first SMA spring 38 and the detent pin 30 is urged into the second recess 34.

Retraction of the combiner 12 is carried out by passing a current through both the first and second SMA springs 38, 50. As explained above, the detent pin 30 is withdrawn from the second recess 34, and the energized second SMA spring 50, contracts, exerting a force greater than the helical spring 48 so as to rotate the combiner arm 14 into retracted position 24.

Referring now to FIG. 4, switching means 56 is shown which allows an aircraft pilot to reposition and to lock into a position a combiner. A power source 60, including an array of internal circuits and switches, is designed to selectively supply the appropriate current to the first SMA spring 38 and second SMA spring 50 for the proper periods to effect the automatic unlocking and then deployment and retraction of the combiner 12. A switch 58 is used by an aircraft pilot to enable the combiner 12 to deploy or retract. For example, if a pilot wishes to retract combiner 12, he would put switch into a retract position. Power source 60 would then send an electrical signal to both first SMA spring 38 and second SMA spring 50. Power source 60 contains an internal circuit which allows first SMA spring 38 to cool prior to second SMA spring 50. This allows detent pin 30 to drop into first recess 32 as explained above. Once combiner arm 14 has moved to a point where combiner arm 14 is stopped against peg 22, second SMA spring 50 is allowed to cool by power source 60. At this time detent pin 30 drops into second recess 34 locking combiner arm 14 in retracted position 24.

Shown in FIG. 5, is an alternative embodiment of a SMA spring mounted in such a way that when the spring is heated by an electrical current, the combiner will be moved from a retracted position to a deployed position. A second SMA spring 100 is used here to deploy the combiner 12, while a helical spring 108 rotates combiner 12 to its retracted position 24. In this configuration, the second SMA spring 100 is placed on the opposite side of the combiner mechanism housing, and is attached to a first peg 103 and a second peg 104. When heated second SMA spring 100 contracts and causes the combiner arm 14 to rotate against the pressure of the helical spring 108 and to move to deployment position 26.

Thus, according to this alternative embodiment, deployment occurs by simultaneously applying electrical current to the first SMA spring 38 and to the second SMA spring 100. After the detent pin 30 momentarily withdraws from the first recess 32 by the force of the heated first SMA spring 38, the second SMA spring 100 contracts and causes combiner arm 14 to rotate into deployed position 26. During the rotation of combiner arm 14, first SMA spring 38 does not receive electrical energy and is allowed to cool. As a result of spring 38 cooling, detent pin 30 is allowed to ride on surface 106 of combiner arm 14. Combiner arm 14 will become locked into the deployed position 26 when detent pin 30 drops into second recess 34. At this point, second SMA spring 100 is also allowed to cool.

When the wearer desires to move the combiner arm out of view, he actuates the retraction/deployment switch 58, which is illustrated in FIG. 4. Unlocking and retraction of the combiner arm 14 is effected by simply momentarily heating the first SMA spring 38 and forcing the withdrawal of the detent pin 30 from the second recess 34. Once the combiner arm 14 is unlocked, the stronger helical second spring 100 causes the combiner arm 14 to swing back into retracted position 24. Since first SMA spring 38 was only momentarily heated, it begins to cool immediately and will allow detent pin 30 to ride on surface 106. As combiner arm 14 rotates, detent pin 30 will drop into first recess 32, locking the mechanism in retracted position 24 as described above.

In a second embodiment illustrated in FIG. 6, a solenoid 120, or any similar device, is used to retract the combiner 12, while either a helical spring (not shown), or a SMA spring 122, is used to deploy the combiner 12. The detent pin mechanism 124, which is identical to mechanical detent pin mechanism 28, may be used to lock the combiner 12 into the deployed and retracted positions 24, 26.

In the third embodiment shown in FIG. 7, deployment and retraction of the combiner 12 can be carried out by means of screw drive mechanism 130 driven by an electrical motor 132 attached to frame 136. Combiner arm 14 is formed so as to have gear teeth 138 cut into its upper surface. Again, a detent pin mechanism 134 is useful to ensure that combiner 12 is precisely locked in either deployed position 26 or retracted position 24. Such precision of deployment is usually not possible with most conventional motors.

Other variations and modifications will occur to those skilled in the art. Accordingly, the present invention should be limited only by the scope of the claims appended hereto.

What we claim is:

1. A device for deploying and retracting a combiner for a visored helmet comprising:

a bracket, wherein the bracket is adapted to be attached to the helmet;

a combiner arm, said combiner arm being rotatably connected to said bracket;

remotely controlled deploying and retracting means coupled to said combiner arm; and selecting means for locking and unlocking said combiner arm into either deployed or retracted position, said selecting means being coordinated to act in conjunction with said deploying and retracting means.

2. Device according to claim 1 wherein said deploying and retracting means include a rotary solenoid interposed between said combiner arm and said bracket, said selecting means supplying power to said solenoid in combination with the action of said selecting means for locking and unlocking said combiner arm.

3. Device according to claim 1 wherein said deploying and retracting means include an electric motor interposed between said combiner arm and said bracket, said selecting means supplying power to said motor in combination with the action of said selecting means for locking and unlocking said combiner arm.

4. Device according to claim 1 further including a means for manually controlling the deployment and retraction of said combiner, said manual controlling means consisting of a knob attached to said combiner arm and working in combination with said selecting means for locking and unlocking said combiner arm.

5. A device for deploying and retracting a combiner for a visored helmet comprising:

a bracket, wherein the bracket is adapted to be attached to the helmet;

a combiner arm, said combiner arm being rotatably connected to said bracket;

deploying and retracting means coupled to said combiner arm, said deploying and retracting means including at least first and second countervailing spring means that exert opposite, but unequal, forces;

said first spring means comprising a helical spring;

said second spring means comprising a coiled spring made of an shape memory alloy material having a quiescent state and, when heated, a memorized state;

said first spring means positioned to urge said combiner arm into the deployed position and exert a force stronger than that of second spring means when in said quiescent state;

said second spring means positioned so as to urge said combiner arm into the retracted position and exert a force stronger than that of said first spring means upon being heated to said memorized state; and selecting means for locking and unlocking said combiner arm into either deployed or retracted position, said selecting means being coordinated to act in conjunction with said deploying and retracting means, said selecting means selectively energizing and de-energizing said second spring means for locking and unlocking of said combiner to permit the deployment and retraction of said combiner.

6. A device for deploying and retracting a combiner for a visored helmet comprising:

a bracket, wherein the bracket is adapted to be attached to the helmet;

a combiner arm, said combiner arm being rotatably connected to said bracket;

deploying and retracting means coupled to said combiner arm; and selecting means for locking and unlocking said combiner arm into either deployed or retracted position, said selecting means being coordinated to act in conjunction with said deploying and retracting means, said selecting means including a bracket including a bearing surface laterally displaced from the face of said bracket, with an opening therethrough;

a detent pin having a cap portion and a lower flange portion;

a first spring made from shape memory alloy material having a quiescent state and a memorized state upon being heated;

a second spring;

at least first and second recesses formed in the upper end of said combiner arm;

said bracket positioned adjacent to the upper end of said combiner arm, such that one end of said detent pin engages said recesses;

said springs fitting around said detent pin, one of said springs being between said cap and said bearing surface, the other of said springs being between said bearing surface and said flange;

said springs being arranged so that said first spring exerts a force urging said detent pin out of a recess, while said second spring exerts a force urging said detent pin into a recess;

said second spring exerting a greater force while said first spring is in quiescent state so that said detent pin is in reliable contact with a recess, said detent pin being lifted out of a recess upon said first spring being heated to assume said memorized state; and said selecting means being able to selectively energize and de-energize said first spring in relation to the deployment or retraction of said combiner by said deployment and retraction means.

7. A device for deploying and retracting a combiner for a visored helmet comprising:

a bracket, wherein the bracket is adapted to be attached to the helmet;

a combiner arm, said combiner arm being rotatably connected to said bracket;

means for deploying and retracting said combiner arm, including at least first and second countervailing spring means which exert opposite, but unequal, forces to said combiner arm;

said first spring means being positioned so as to urge said combiner arm into the deployed position;

said second spring means being positioned so as to urge said combiner arm into the retracted position;

one of said spring means including a conventional spring, the other of said spring means including a spring made of a shape memory alloy material having a quiescent state and a memorized state, said shape memory alloy spring assuming said memorized state upon being heated, and returning to said quiescent state upon being cooled; and selecting means for locking and unlocking said combiner arm into either extended or retracted position, said selecting means selectively energizing and de-energizing said spring means made of shape memory alloy material.

8. Device according to claim 7 wherein said first spring means includes a conventional spring and said second spring means includes a spring made from shape memory alloy material; and said first spring means being stronger than said second spring means in quiescent state, and said second spring means in memorized state being stronger than said first spring means.

9. Device according to claim 7 wherein said first spring means include spring made from shape memory alloy material and said second spring means include a conventional spring; and said second spring means being stronger than said first spring means in quiescent state, and said first spring means in memorized state being stronger than said second spring means.

10. Device according to claim 7 wherein said selecting means include:

a bracket including a bearing surface laterally displaced from the face of said bracket, with an opening therethrough;

a detent pin having a cap portion and a lower flange portion;

a first spring made from shape memory alloy material having a quiescent state and a memorized state upon being heated;

a second spring;

at least first and second recesses formed in the upper end of said combiner arm;

said bracket positioned adjacent to the upper end of said combiner arm, such that one end of said detent pin engages said recesses;

said springs fitting around said detent pin, one of said springs being between said cap and said bearing surface, the other of said springs being between said bearing surface and said flange;

said springs being arranged so that said first spring exerts a force urging said detent pin out of a recess, while said second spring exerts a force urging said detent pin into a recess;

said second spring exerting a greater force while said first spring is in quiescent state so that said detent pin is in reliable contact with a recess, said detent pin being lifted out of a recess upon said first spring being heated to assume said memorized state; and said selecting means being able to selectively energize and de-energize said first spring in relation to the deployment or retraction of said combiner by said deployment and retraction means.

11. A device for automatically deploying and retracting a combiner for a visored aircraft pilot helmet comprising:

a bracket, wherein the bracket is adapted to be attached to the helmet;

a combiner arm, said combiner arm being rotatably connected said bracket;

means for deploying and retracting said combiner arm including a rotary solenoid interposed between said combiner arm and said bracket; and selecting means for locking and unlocking said combiner arm into either extended or retracted position, said selecting means supplying power to said solenoid in combination with the action of said selecting means for locking and unlocking said combiner arm.

12. Device according to claim 11 wherein said selecting means include:

a bracket including a bearing surface laterally displaced from the face of said bracket, with an opening therethrough;

a detent pin having a cap portion and a lower flange portion;

a first spring made from shape memory alloy material having a quiescent state and a memorized state upon being heated;

a second spring;

at least first and second recesses formed in the upper end of said combiner arm;

said bracket positioned adjacent to the upper end of said combiner arm, such that one end of said detent pin engages said recesses;

said springs fitting around said detent pin, one of said springs being between said cap and said bearing surface, the other of said springs being between said bearing surface and said flange;

said springs being arranged so that said first spring exerts a force urging said detent pin out of a recess, while said second spring exerts a force urging said detent pin into a recess;

said second spring exerting a greater force while said first spring is in quiescent state so that said detent pin is in reliable contact with a recess, said detent pin being lifted out of a recess upon said first spring being heated to assume said memorized state; and said selecting means being able to selectively energize and de-energize said first spring in relation to the deployment or retraction of said combiner by said deployment and retraction means.

13. A device for automatically deploying and retracting a combiner for a visored aircraft pilot helmet comprising:

a bracket, wherein the bracket is adapted to be attached to the helmet;

a combiner arm, said combiner arm being rotatably connected said bracket;

means for deploying and retracting said combiner arm including an electric motor interposed between said combiner ar, and said bracket; and selecting means for locking and unlocking said combiner arm into either extended or retracted position, said selecting means supplying power to said motor in combination with the action of said selecting means for locking and unlocking said combiner arm.

14. Device according to claim 13 wherein said selecting means include:

a bracket including a bearing surface laterally displaced from the face of said bracket, with an opening therethrough;

a detent pin having a cap portion and a lower flange portion;

a first spring made from shape memory alloy material having a quiescent state and a memorized state upon being heated;

a second spring;

at least first and second recesses formed in the upper end of said combiner arm;

said bracket positioned adjacent to the upper end of said combiner arm, such that one end of said detent pin engages said recesses;

said springs fitting around said detent pin, one of said springs being between said cap and said bearing surface, the other of said springs being between said bearing surface and said flange;

said springs being arranged so that said first spring exerts a force urging said detent pin out of a recess, while said second spring exerts a force urging said detent pin into a recess;

said second spring exerting a greater force while said first spring is in quiescent state so that said detent pin is in reliable contact with a recess, said detent pin being lifted out of a recess upon said first spring being heated to assume said memorized state; and said selecting means being able to selectively energize and de-energize said first spring in relation to the deployment or retraction of said combiner by said deployment and retraction means.

* * * * *